United States Patent [19]

Kelley et al.

[11] Patent Number: 5,280,636
[45] Date of Patent: Jan. 18, 1994

[54] MULTI-BAND DIGITAL RECEIVING APPARATUS AND METHOD WITH BANDWIDTH REDUCTION

[75] Inventors: Edwin A. Kelley, Los Angeles; Roger N. Kosaka, Torrance, both of Calif.

[73] Assignee: Hughes Aircraft Company, Los Angeles, Calif.

[21] Appl. No.: 714,494

[22] Filed: Jun. 13, 1991

[51] Int. Cl.$^5$ ............................................. H04B 1/16
[52] U.S. Cl. ................................ 455/131; 455/168.1; 455/180.1; 455/190.1; 455/266; 455/313; 375/122
[58] Field of Search ............... 455/131, 132, 142, 143, 455/168.1, 180.1, 188.1, 189.1, 190.1, 206, 207, 216, 313, 266; 370/70, 120, 121; 375/122

[56] References Cited

U.S. PATENT DOCUMENTS

| | | | |
|---|---|---|---|
| 4,853,944 | 8/1989 | Lo et al. | 455/142 |
| 4,881,272 | 11/1989 | Eguchi | 455/180.1 X |
| 5,027,430 | 6/1991 | Yamauchi et al. | 455/190.1 X |
| 5,058,107 | 10/1991 | Stone et al. | 370/69.1 |

FOREIGN PATENT DOCUMENTS

| | | | |
|---|---|---|---|
| 0052642 | 4/1980 | Japan | 455/190.1 |
| 0230228 | 10/1987 | Japan | 455/190.1 |

*Primary Examiner*—Reinhard J. Eisenzopf
*Assistant Examiner*—Chi H. Pham
*Attorney, Agent, or Firm*—Georgann S. Grunebach; Terje Gudmestad; W. K. Denson-Low

[57] ABSTRACT

Multiple simultaneous uses of a multi-service digital receiver are made possible with a single practical analog-to-digital converter by translating the various service bands in frequency to form a single, generally continuous composite service band in which substantial frequency gaps between the different services are eliminated. Bandwidth requirements are further reduced by a bandfolding technique in which at least one service waveband is divided about an intermediate mixing frequency, the divided portions are overlapped so that they collectively occupy a sub-waveband with a smaller bandwidth than the original band, and the mixing frequency is chosen such that user-selected frequencies do not interfere with other active frequencies. Interference between non-selected active frequencies is permissible and simply ignored.

24 Claims, 3 Drawing Sheets

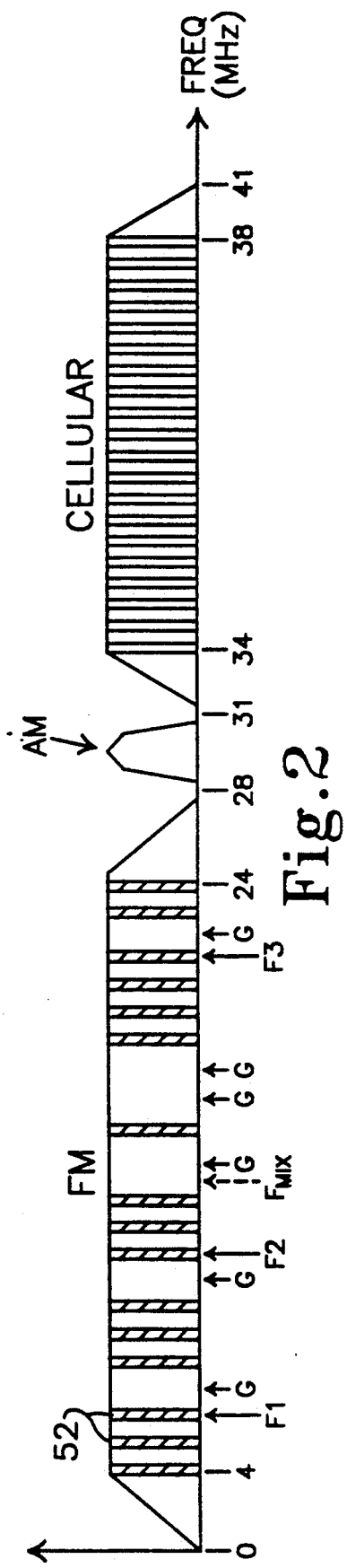
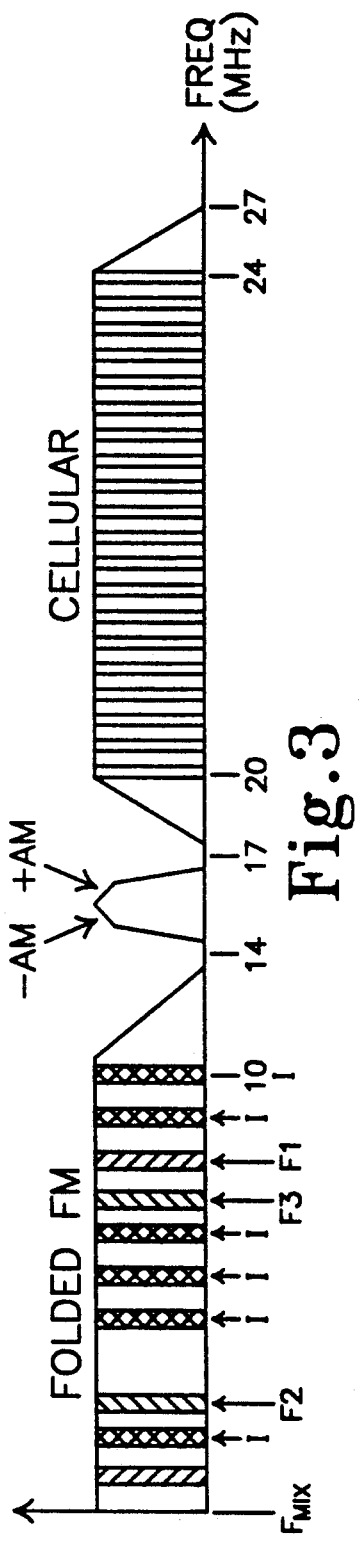
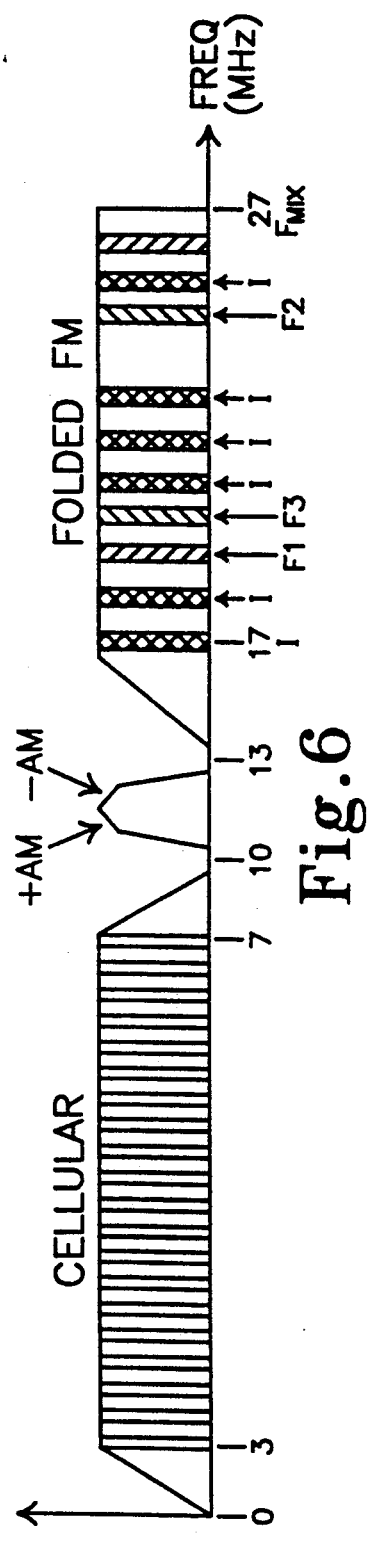
Fig.2
Fig.3
Fig.6

MULTI-BAND DIGITAL RECEIVING APPARATUS AND METHOD WITH BANDWIDTH REDUCTION

BACKGROUND OF THE INVENTION

1. Field of the Invention

This invention relates to digital receivers, and more particularly to digital receiving methods and systems that are intended to be used to receive signals within multiple wavebands that are separated from each other along the electromagnetic spectrum.

2. Description of the Related Art

Conventional automobile radio systems have amplitude modulation (AM) and frequency modulation (FM) capabilities. Many automobiles are also equipped with cellular radios for both reception and transmission. Additional services that utilize other portions of the electromagnetic spectrum and are either currently being implemented or are expected to be implemented in the future include facsimile, computer, and global positioning system (GPS) services. Reception of the various services is complicated by a desire to accommodate multiple simultaneous users of either different services, or of the same service. For example, it is desirable to have a capacity for cellular telephone calls at the same time the radio is playing on either AM or FM. It is also anticipated that different users will be able to plug into the communications system at the same time, such as by separate headphones assigned to different passengers, with each passenger having the ability to receive his or her own radio station while the other passengers are listening to their individual stations.

The different broadcast bands are very dissimilar in terms of their bandwidths, modulation technology and band operation. The conventional approach to receiving multiple channels over multiple bands is to simply provide multiple receivers, with a separate receiver assigned to each band and multiple receivers assigned to the same band if it is desired to permit multiple simultaneous uses of that band. Each additional receiver incurs a penalty in terms of cost, weight, power and space requirements.

Digital receivers have been perceived as a way to accommodate very dissimilar types of modulations with a single receiver mechanism, eliminating the need for costly multiple receivers. Since the channel selection frequency tuning, channel isolation and de-modulation are all accomplished digitally, only a single digital receiver path is required for all of these functions. A transition between different broadcasting formats and bandwidths is accomplished by simply changing filter coefficients in the digital filters and the de-modulation algorithms in a programmable de-modulator. Such a system is envisioned in copending U.S. patent application Ser. No. 07/293,894, filed Jan. 5, 1989 by Stone et al. and assigned to Hughes Aircraft Company, the assignee of the present invention.

While the co-pending patent application achieves a significant reduction in system complexity and cost by using common digital computation for the different service bands, it is still costly when used for services that are widely separated in frequency. For example, AM uses the broadcast band of 0.540-1.600 MHz with 15 KHz channel bandwidths, FM has a broadcast band of 87.9-107.9 MHz with 400 KHz channel spacings and 150 KHz channel bandwidths, while cellular phone occupies the broadcast band of 865-895 MHz with 24 KHz channel bandwidths and 30 KHz channel spacings (with either an FM or digital modulation broadcasting format). It would be very expensive, and beyond the limits of currently available equipment, to digitize the entire electromagnetic spectrum over these different bands with a single analog-to-digital converter (ADC). However, if the three bands are digitized separately with separate ADCs for each band, the system expense is increased considerably because of the multiplicity in ADCs.

In U.S. Pat. No. 4,884,265 to Schroeder et al., assigned to Loral Corporation, a frequency division multiplex input signal is also sampled in an ADC. The samples are translated by mixing with baseband frequency signals to yield real and imaginary values corresponding to phase information in the original modulation signals. After translation, the samples are filtered in real and imaginary digital filters. The original modulation information is then recovered by analysis of the positions of vectors in the complex plane represented by the real and imaginary values. The translation is preferably performed by multiplying the input samples by digital values which correspond to sine and cosine values of local oscillator signals at baseband frequencies. The use of pre-select filtering prior to translation to decimate the input samples and thereby reduce subsequent processing requirements is suggested.

While it is an improvement in digital receiver design, the de-modulator disclosed in this patent again does not resolve the problem of handling multiple simultaneous uses of widely separated bands without unduly increasing the complexity or cost of the necessary ADCs.

SUMMARY OF THE INVENTION

The present invention seeks to provide a digital method and apparatus for receiving and processing signals over wavebands that are widely separated in frequency, and for providing multiple simultaneous access to signals within those wavebands, with hardware that is relatively inexpensive, avoids the redundant capacity encountered in prior systems, and can be implemented with a single conventional ADC.

In the accomplishment of these goals, the separate wavebands are translated in frequency so that they form a single, generally continuous composite waveband in which the wide frequency gaps between the bands are substantially eliminated. The waveband translation is preferably accomplished by mixing the different bands with oscillator signals at specifically selected mix frequencies.

To further reduce the composite bandwidth, at least one of the wavebands is "bandfolded" by dividing it into portions that are overlapped within a reduced bandwidth. The bandfolding is accomplished by mixing the waveband with an oscillator signal having an intermediate frequency that is preferably located within the central region of the waveband, so that signals on both sides of the oscillator frequency are referenced to the same oscillator signal.

With conventional radio transmission in which channels are restricted to a plurality of discrete and mutually spaced frequencies, of which several may be selected at any given time in a multi-service system, the base frequency for bandfolding is selected such that the desired frequencies for listening do not interfere with the remainder of the active frequencies. This is accomplished by first identifying a tentative base frequency, determining whether there will be interference between the desired frequencies and the remaining active frequencies with that tentative base frequency, incrementing the tentative base frequency to a new frequency value if the presence of interference is indicated, and continuing to determine the presence of interference and to increment the tentative base frequency value until a base frequency that does not result in interference is located. The selection of a suitable base frequency for bandfolding is considerably simplified by allowing interference between active frequencies that are not desired for listening; since these frequencies are not being listened to, the presence of interference does not degrade from the system performance.

When applied to the FM band of 87.9–107.9 MHz in which potential active frequencies are located at odd tenths of a MHz, the base frequency is preferably selected at an even tenth of a MHz. Preferably starting at either 97.0 or 98.8 MHz, the base frequency is incremented in 0.2 MHz steps towards the center frequency of 97.9 MHz (and across the center frequency if necessary), until a suitable base frequency is located. A simple algorithm is performed very rapidly for each tentative base frequency to determine whether it is suitable; the necessary computations are performed well within the time in which they would be noticed by the listener.

The AM, FM and a block of the cellular band, including guard bands, can be translated into a substantially continuous composite band that extends over 41 MHz, requiring analog-digital encoding at a rate of at least 82 megasamples per second. This bandwidth can be further reduced with the described bandfolding technique to a composite value of only about 27–28 MHz, and a corresponding analog-digital encoding rate of 56 megasamples per second. Further features and advantages of the invention will be apparent to those skilled in the art from the following detailed description, taken together with the accompanying drawings, in which:

DESCRIPTION OF THE DRAWINGS

FIG. 2 is a waveband diagram showing FM, AM and cellular sub-bands after translation into a continuous composite waveband in accordance with the invention;

FIG. 3 is a waveband diagram of the composite waveband of FIG. 2, after bandfolding the FM band;

FIG. 6 is a waveband diagram of a composite band with an FM sub-band bandfolded about 28 MHz.

DETAILED DESCRIPTION OF THE INVENTION

Figure 1:
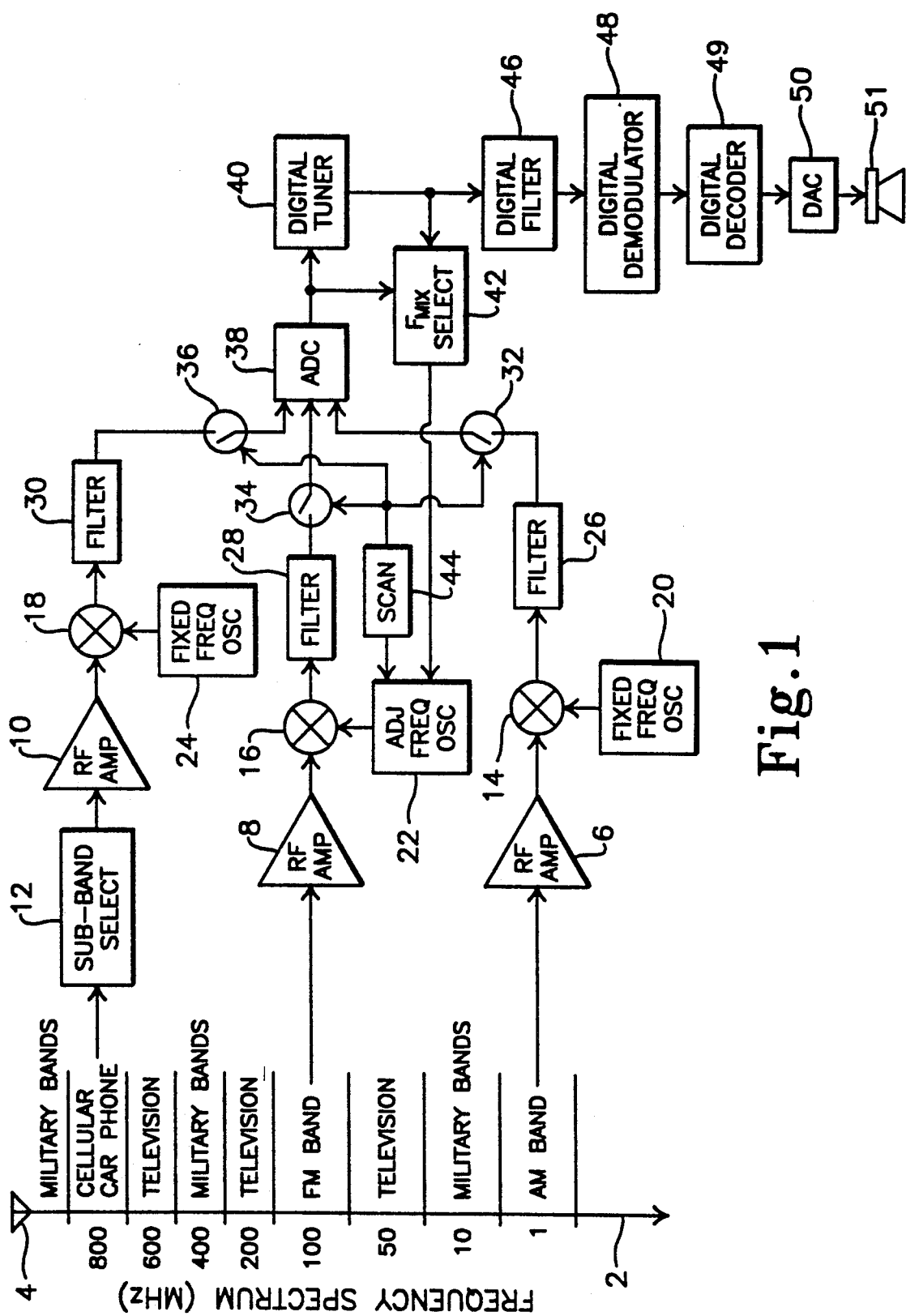
FIG. 1 is a block diagram of a multi-band system incorporating the invention.

A block diagram of a preferred implementation for the present invention is given in FIG. 1. It shows a multiple service digital receiver that is intended to simultaneously receive several channels of a given service, such as AM, FM, cellular, facsimile, computer, etc., or a number of channels from a combination of different services. In effect, a single piece of hardware functions as a number of independently operating receivers. The radio frequency spectrum is plotted along a vertical axis 2 on the left-hand side of the figure to illustrate some of the different types of services that can be accommodated. An antenna 4, which is preferably implemented as a collection of antenna elements with one antenna for each desired service, is mounted to the automobile or any other desired receiver facility.

In the illustration of FIG. 1, analog AM, FM and cellular bands are received and amplified by respective radio frequency (RF) amplifiers 6, 8 and 10. Since the cellular service band of 865–895 MHz may be too large for convenient downstream digitization, it is preferably broken up into sub-bands that are switched on demand into a fixed region of the input bandwidth that is specifically allocated for cellular service. The cellular sub-bands are selected by changing a cellular local oscillator frequency, discussed below, in discrete steps. Multiple cellular voice channels can be handled without sub-band switching if the sub-band is wide enough to encompass all voice channels allocated. If the voice channels assigned are in different sub-bands, the sub-bands may be switched into the frequency band allocated for cellular voice by time division multiplexing. As illustrated, a cellular sub-band select switch 12 divides the cellular band into eight sub-bands of approximately 4 MHz each, plus a pair of 3 MHz guard bands at either end.

The outputs of RF amplifiers 6, 8 and 10 are supplied respectively to mixers 14, 16 and 18, where they are respectively mixed with signals from local oscillators 20, 22 and 24. The frequency of each local oscillator is selected to translate its respective RF input to a restricted bandwidth base band that eliminates the large gaps between the original service bands. For the example of FM, AM and cellular service bands, the FM band occupies about 20 MHz plus 4 MHz guard bands at either end, AM occupies a band of about 3 MHz including guard bands, and a 4 MHz cellular sub-band requires 3 MHz guard bands at either end. This gives a total bandwidth of 41 MHz if the frequency gaps between the three service bands are eliminated. If the FM oscillator 22 is set at 83.9 MHz, the AM oscillator 20 is set at 111.9 MHz and the cellular oscillator 24 is set at 114.9 MHz, the three services will occupy the following adjacent bands (including guard bands):

FM: 83.9–111.9 MHz
AM: 111.9–114.9 MHz
Cellular: 114.9–124.9 MHz

This continuous base band has a minimum Nyquist frequency of 41 MHz, which translates to a minimum analog-to-digital encoding rate of at least 82 megasamples per second.

While in the described example the FM service is set at the lower end of the composite band, cellular at the upper end and AM in the middle, the relative positions of the various service bands can be interchanged at will by appropriate selections of their respective oscillator frequencies. However, it is desirable to locate the FM service band at one end of the composite band to accommodate a "bandfolding" technique, discussed below, that further reduces the system's bandwidth requirements. The AM band is preferably translated to the next lowest frequency portion of the composite waveband. Since AM service requires a substantial instantaneous dynamic range, it is translated towards the lower end of the input bandwidth where the number of analog-to-digital effective bits are the highest, and the (sin x)/x attenuation is low. Cellular service is placed within the remaining composite bandwidth.

Local oscillators 20 and 24 for AM and cellular service are illustrated as fixed frequency oscillators, while local oscillator 22 for FM service is illustrated as an adjustable frequency oscillator. The frequency adjustment capability is part of the "bandfolding" feature. As discussed below, this feature could also be provided in connection with other services.

The frequency-translated service bands produced by mixers 14, 16 and 18 are processed through analog filters 26, 28 and 30, respectively. These filters are conventional in design, and serve several functions. Bandpass RF filters are provided to reject out-of-band signals and noise power, such as the television channel 6 which is located just below the FM band. IF bandpass filters are provided to reject mixing images and local oscillator spurs. Lowpass and highpass filters employed for the AM service band can be efficiently and cost-effectively implemented with LC-type, or specialized active filters. For bandpass filters in the A/D input bandwidth, passive LC filters are preferred, while for high VHF and UHF, surface acoustic wave filters may be needed.

The outputs of filters 26, 28 and 30 are transmitted through respective switches 32, 34 and 36 as a composite input to a single ADC 38, which digitizes the analog input and delivers it to a digital tuner 40. The tuner is controlled by the user(s) to select the desired AM and/or FM channels for listening, and/or a cellular channel. All of the channels for which the received signal exceeds a threshold level, indicating that the receiver is within the channel's service area (referred to hereinafter as "active channels"), including the user-selected channels, are provided to an $F_{mix}$ select circuit 42. This circuit selects the mixing frequency ($F_{mix}$) for the adjustable frequency oscillator 22 so as to establish a base frequency for the bandfolding waveband reduction. When it is desired to scan through the FM band to locate a desired channel, a scan circuit 44 is actuated that momentarily interrupts the services supplied through switches 32, 34 and 36, and disables the FM bandfolding by adjusting the frequency of oscillator 22 so that it corresponds to one end of the FM band. In this manner the entire FM band is available for scanning. While the additional bandwidth reduction provided by the bandfolding technique is not used during a scanning mode, the temporary deletion of the AM and cellular bands leaves enough bandwidth available for the full FM service band.

A digital filter 46, digital demodulator 48 and digital decoder 49 are provided downstream from the digital tuner 40 to process the selected digital signals and condition them for analog playback. A digital signal processor (DSP) is preferably used to implement these functions, as well as the $F_{mix}$ select function. A DSP can implement filters of arbitrary shape factor, and lends itself to high performance demodulation and adaptive optimal detection algorithms. By selecting a DSP with a sufficiently high throughput, several narrowband signals can be demodulated concurrently. This results in the single hardware system of FIG. 1 providing the function of a number of independently operating receivers, which may be tuned to either separate service bands, or to multiple frequencies within a single service band. After decoding the signal is converted to analog format in a digital-to-analog converter (DAC) 50, and then supplied to a speaker or other output device 51.

FIG. 2 illustrates a composite waveband that results from translating the FM and AM bands and the cellular sub-band to a substantially continuous portion of the frequency spectrum. The FM, AM and cellular service bands are shown translated to a composite service band which extends from DC up to 41 MHz. There are no significant gaps between the various service bands resulting in a significant reduction in both bandwidth and digitization requirements.

A further substantial reduction in bandwidth can be achieved with a new bandfolding technique. In FIG. 2, active channel frequencies for a particular location are indicated by hatched bars 52. With a 20 MHz FM band and potential station locations each 200 KHz, a maximum of 100 stations can be accommodated. However, for any given location many of the channels will not be occupied by an active station. These empty channels are indicated by gaps G in FIG. 2 (the total number of channels has been reduced in FIG. 2 for simplification). Assuming that three different channels are selected simultaneously by three different users of the system, the selected channels are indicated by numerals F1, F2 and F3. The bandfolding technique described herein conserves bandwidth by actively determining the gap locations, and utilizing them to accommodate the selected stations F1, F2, F3. In so doing, an interference between non-selected active stations will normally result. However since the non-selected stations are by definition not being listened to, the interference does not matter. When a new station is selected, the bandfolding operation is repeated to coordinate the gaps with the new selected station pattern, assuring that the new stations are accommodated within corresponding gaps without interference with other active stations that have not been selected.

The bandfolding is accomplished by setting the mixing frequency of adjustable frequency oscillator 22 at an intermediate frequency within the FM band, rather than at 84 MHz or 112 MHz at one end or the other of the FM band (including guard bands). The exact FM mixing frequency is preferably selected to be at or near the middle of the band. The FM band in effect "folds over" the mixing frequency $F_{mix}$, with the portion of the band below $F_{mix}$ superimposed over the portion above $F_{mix}$. If $F_{mix}$ is selected to be the center of the FM band, the guard band at the lower end of the FM band will exactly overlap the guard band at the upper end after folding. To the extent that $F_{mix}$ is offset from the center of the FM band, the lower end of the band will be offset from the upper end by twice that amount after folding.

FIG. 3 illustrates an example of the composite service bands after the FM band has been folded in this manner. Assume $F_{mix}$ has been selected at about the center of the FM band. After folding, F1, F2 and F3 are all located in gap locations on the opposite side of $F_{mix}$. In this manner the FM bandwidth may be reduced to as little as half its unfolded level, assuming $F_{mix}$ is selected at about the middle of the band.

Figure 4:
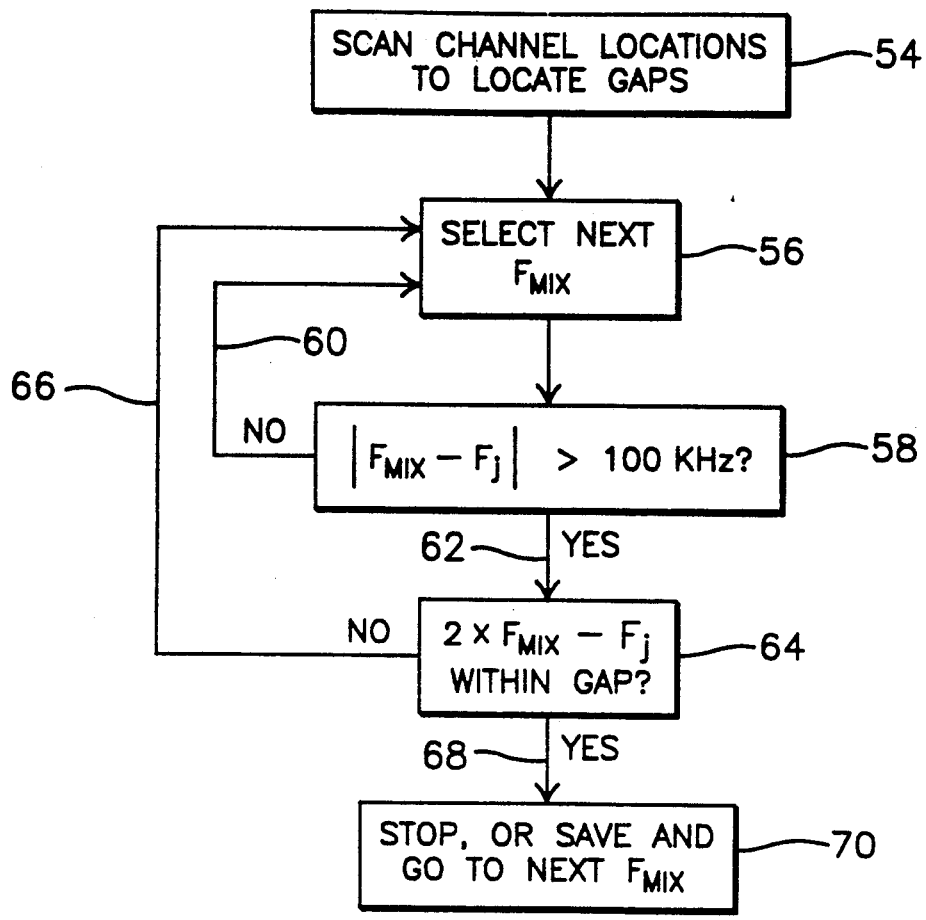
FIG. 4 is a flow diagram illustrating an algorithm used to determine a base frequency for bandfolding.

The $F_{mix}$ select DSP 42 (FIG. 1) is programmed to select an $F_{mix}$ that produces a bandfolding without interference between the selected stations and other active stations, while ignoring interference between non-selected active stations. A summary flow diagram for the algorithm which it is programmed to perform is given in FIG. 4. Initially, the digitally encoded channel locations from ADC 38 are scanned to locate the gap frequencies (block 54). A tentative $F_{mix}$ is then selected (block 56). With the FM station locations at each odd tenth of a MHz (e.g. 87.9, 88.1, 88.3, etc.), $F_{mix}$ is chosen to be an even tenth of a MHz so that it will be positioned between channel locations. While the selection of a first tentative $F_{mix}$ is somewhat arbitrary, in the preferred embodiment either 97.0 or 98.8 MHz is selected because it is reasonably close to the center of the band.

The tentative $F_{mix}$ is then compared with the selected station frequencies $F_1$, $F_2$, $F_3$ (collectively designated $F_j$) to see if it differs from the selected stations by more than 100 KHz (block 58). This frequency separation is desirable to minimize "1/f" noise (which varies inversely with the difference between a selected frequency and the local oscillator frequency), and to keep the selected station clear of the local oscillator frequency. If the $F_{mix}-F_j$ differential is not greater than 100 KHz, the first tentative $F_{mix}$ is rejected and the system loops back along line 60 to block 56 to select the next tentative $F_{mix}$ (97.2 MHz follows 97.0; 98.6 MHz follows 98.8).

If there is a sufficient clearance between $F_{mix}$ and the selected stations $F_j$ (line 62), a determination is then made as to whether each selected station frequency will fall within a gap in the folded waveband (block 64). This is accomplished by doubling $F_{mix}$, and subtracting the frequencies of each of the selected stations $F_{j\ in\ turn}$. If the result for any station does not coincide with a gap as determined in block 54, the system loops back along line 66 to select the next tentative $F_{mix}$. If the result is positive for each selected channel (line 68), the tentative $F_{mix}$ is validated as a usable local oscillator frequency for the FM band. At this point the algorithm may either be stopped, or the validated $F_{mix}$ may be saved and the iterations continued to locate all of the usable $F_{mixes}$ (block 70).

Figure 5:
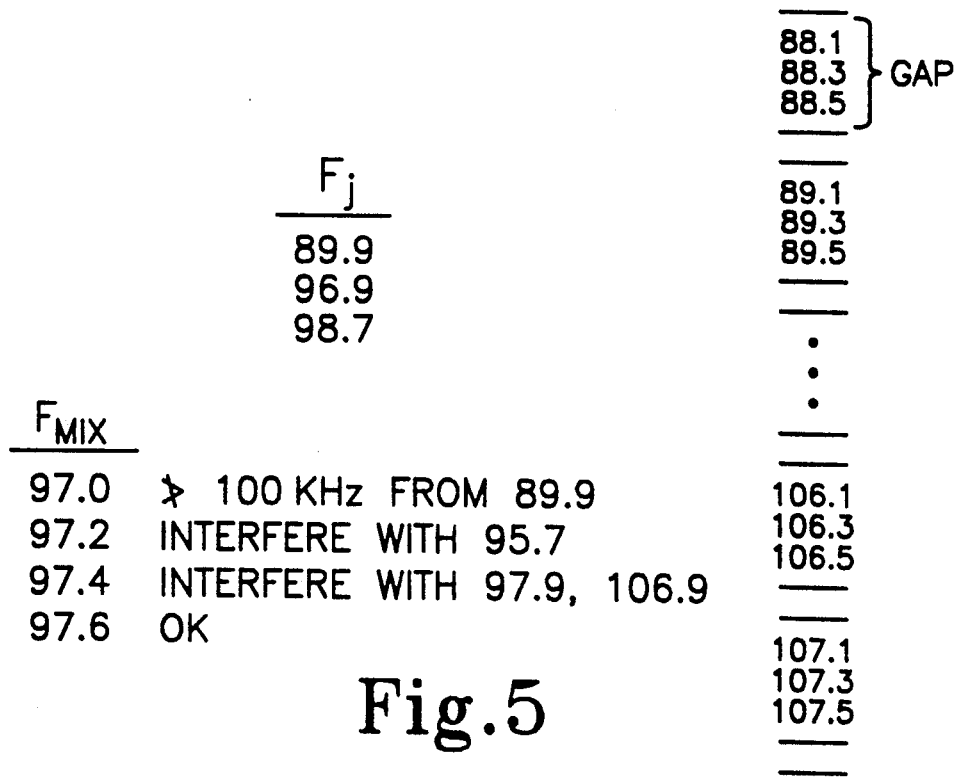
FIG. 5 is a diagram illustrating the operation of the algorithm.

An arbitrary example of the $F_{mix}$ selection algorithm is summarized in FIG. 5. Assume for purposes of illustration that each channel frequency ending in 0.1, 0.3 or 0.5 MHz represents a gap, while the other channel frequencies ending in 0.7 or 0.9 MHz are occupied by active stations. Assume further that the $F_j$ stations selected by the users are at 89.9, 96.9 and 98.7 MHz.

The algorithm begins with the selection of 97.0 MHz as a tentative $F_{mix}$. However, this frequency is not greater than 100 KHz from $F_j=96.9$ MHz, so it is rejected. The next tentative $F_{mix}$ is 97.2, which is more than 100 KHz from each $F_j$. It also satisfies the requirement that $(2\times F_{mix}-F_j)$ be within a gap for $F_j=89.9$ and 96.9 MHz. However, for $F_j=98.7$ MHz the result of the calculation is 95.7 MHz, which coincides with an active station frequency. 97.2 MHz is therefore unsatisfactory for $F_{mix}$.

The next tentative $F_{mix}$ is 97.4 MHz. This frequency again is sufficiently spaced from each $F_j$, but it results in an interference between $F_j=89.9$ and 96.9 MHz (which interfers respectively with active stations at 106.9 and 97.9 MHz).

The algorithm accordingly increments to the next tentative $F_{mix}$ at 97.6 MHz. This frequency satisfies the requirements for both spacing from selected stations, and a lack of interference between the selected and the non-selected active stations after the FM band has been folded about $F_{mix}$. Accordingly, 97.6 MHz is identified as a suitable $F_{mix}$ for this particular pattern of active stations, gaps and selected stations for listening.

It should be noted that, even though the selected frequencies $F_j$ must all reside within frequency gaps after bandfolding, other active station frequencies that have not been selected may coincide with pre-existing active station frequencies after folding about $F_{mix}$. This situation is illustrated in FIG. 3, which shows the results of bandfolding the FM spectrum of FIG. 2 about a particular $F_{mix}$. The interferring active stations are indicated by crosshatched bars I. Since these stations are not being listened to, the interference does not detract from the users' reception. The active stations on one side of $F_{mix}$ that are located within gaps on the other side of $F_{mix}$ after bandfolding are indicated by single-hatched shading. $F_j=F_1$, $F_2$, $F_3$ are included within these non-interferring stations from the algorithm described above, thus assuring that the stations selected by the users at any given time are free of interference with other stations.

The frequency locations of the station gaps are determined by scanning through each of the 100 possible station locations provided in digital format ADC 38. This scanning can be accomplished with a conventional DSP at about msec per station location, resulting in a total scan time of only about a fifth of a second. This is well within the comfort range of a listener who has just made a new station selection.

If desired, the FM band can be translated to the upper end of the composite waveband and bandfolded in a manner analogous to that just described. With an $F_{mix}$ near the center of the FM band, the total composite bandwidth can be reduced to as little as about 27 or 28 MHz, including adequate guardbands for each of the three service bands. A further reduction in total bandwidth may be accomplished by bandfolding the cellular band in a similar manner. The invention is also applicable to other types of broadcast services, as mentioned above.

While several illustrative embodiments of the invention have been shown and described, numerous variations and alternate embodiments will occur to those skilled in the art. For example, band folding can be accomplished by using aliased images from a band pass or RF ADC, rather than by mixing with a base frequency. Such variations and alternate embodiments are contemplated and may be made without departing from the spirit and scope of the invention as defined in the appended claims.

We claim:

1. A method of reducing the effective bandwidth of a waveband of electromagnetic communications frequencies without reducing its signal carrying capacity, said waveband having a plurality of discrete and mutually spaced active frequencies from which at least one desired frequency may be selected, comprising:
   dividing said waveband into multiple portions,
   selecting said waveband portions so that said desired frequencies do not interfere with the remainder of said active frequencies, and
   overlapping said waveband portions so that they collectively occupy a sub-waveband with a smaller bandwidth than said waveband.

2. The method of claim 1, wherein a pair of waveband portions are selected and overlapped by selecting a mix frequency within said waveband, and mixing the signals within said waveband with said mix frequency.

3. The method of claim 2, wherein said mix frequency is selected from a central region of said waveband.

4. The method of claim 2, wherein said mix frequency is selected from outside a central region of said waveband.

5. The method of claim 1, wherein said waveband is divided into a pair of waveband portions that extend from either side of a base frequency, and said waveband portions are overlapped by folding one of them over said base frequency.

6. The method of claim 5, wherein said base frequency is selected by identifying a tentative base frequency, determining whether there will be interference between said desired frequencies and the remaining active frequencies with said tentative base frequency, incrementing the tentative base frequency to a new frequency value if said determination indicates the presence of interference, and continuing to determine the presence of interference and to increment the tentative base frequency to a new frequency value until a base frequency that does not result in interference is located.

7. The method of claim 6, for frequency modulated (FM) communications having active frequencies at odd tenths of a megahertz (MHz), wherein said base frequency is selected with an even tenth of a MHz.

8. The method of claim 7, wherein said base frequency is selected so that said desired frequencies are at odd tenths of a MHz that are not occupied by any other active frequencies after the waveband portions have been folded.

9. The method of claim 6, wherein said tentative base frequency is initially selected from the central region of said waveband but offset from its exact center.

10. The method of claim 9, wherein said tentative base frequency is incremented in the opposite direction from said offset until a base frequency that does not result in interference is located.

11. The method of claim 10, for frequency modulated (FM) communications within the waveband 87.9–107.9 megahertz (MHz), wherein said base frequency is initially selected as 97.0 or 98.8 MHz.

12. The method of claim 6, wherein said tentative frequency is initially selected from outside the central region of said waveband.

13. The method of claim 6, for frequency modulated (FM) communications, wherein said base frequency is selected to be greater than 100 kilohertz (KHz) from said desired frequencies.

14. The method of claim 5, wherein interference between active frequencies other than said desired frequencies is disregarded.

15. The method of claim 1, wherein said active frequencies are initially determined by scanning through said waveband prior to folding, and said waveband portions are selected after said active frequencies have been determined.

16. The method of claim 1, wherein said communications are initially received in analog format, further comprising the step of converting them to a digital format from which said at least one desired frequency may be selected.

17. A reduced bandwidth reception method for receiving electromagnetic communications within a plurality of individual wavebands that are mutually spaced along the electromagnetic spectrum, comprising:
translating at least some of said wavebands in frequency to form a single substantially continuous composite waveband, and
folding an individual waveband at an end of said composite waveband over an intermediate base frequency within said waveband so that said base frequency defines a reduced bandwidth limit for said composite waveband.

18. The method of claim 17, said folded waveband having a plurality of discrete and mutually spaced active frequencies from which at least one desired frequency may be selected, wherein said base frequency is selected by identifying a tentative base frequency, determining whether there will be interference between said desired frequencies and the remaining active frequencies with said tentative base frequency, incrementing the tentative base frequency to a new frequency value if said determination indicates the presence of interference, and continuing to determine the presence of interference and to increment the tentative base frequency to a new frequency value until a base frequency that does not result in interference is located.

19. The method of claim 17, wherein said communications are initially received in analog format, further comprising the step of converting them in common to a digital format after said wavebands have been translated.

20. A receiver for a plurality of individual electromagnetic communications wavebands that are mutually spaced along the electromagnetic spectrum, comprising:
means for translating at least some of said wavebands in frequency so that said wavebands form a single generally continuous composite waveband having a bandwidth substantially less than the aggregate bandwidth of said individual wavebands prior to translation,
a single analog-to-digital converter connected to convert received analog signals within said composite waveband to digital format, and
digital tuning means for selecting at least one desired reception frequency from said digitized composite waveband.

21. A receiver for a plurality of individual electromagnetic communications wavebands that are mutually spaced along the electromagnetic spectrum, comprising:
means for translating at least some of said wavebands in frequency so that said wavebands form a single generally continuous composite waveband having a bandwidth substantially less than the aggregate bandwidth of said individual wavebands prior to translation, said translating means comprising respective oscillators for mixing the signals within each of said individual wavebands with respective oscillation signals, wherein the frequencies of said oscillation signals are selected to establish said frequency translations,
a single analog-to-digital converter connected to convert received analog signals within said composite waveband to digital format, and
digital tuning means for selecting at least one desired reception frequency from said digitized composite waveband.

22. The receiver of claim 21, including means for selecting an oscillation frequency for one of said individual wavebands such that said waveband folds over said selected oscillation frequency with overlapping sub-wavebands on either side of said selected oscillation frequency.

23. The receiver of claim 22, for a folded waveband having a plurality of discrete and mutually spaced active frequencies from which at least one desired frequency may be selected, said means for selecting an oscillation frequency including means for selecting an oscillation frequency to avoid interference between said selected reception frequencies and the remaining active frequencies.

24. The receiver of claim 23, said means for selecting an oscillation frequency comprising means for identifying a tentative oscillation frequency, for determining whether there will be interference between said desired reception frequencies and the remaining active frequencies with said tentative oscillation frequency, for incrementing the tentative oscillation frequency to a new frequency value if said determination indicates the presence of interference, and for continuing to determine the presence of interference and to increment the tentative oscillation frequency to a new frequency value until an oscillation frequency that does not result in interference is located.

* * * * *